(12) United States Patent
Xu et al.

(10) Patent No.: US 11,696,231 B2
(45) Date of Patent: Jul. 4, 2023

(54) REFERENCE SIGNAL DESIGN FOR IDLE AND INACTIVE MODE USER EQUIPMENTS

(71) Applicant: QUALCOMM Incorporated, San Diego, CA (US)

(72) Inventors: Huilin Xu, Temecula, CA (US); Peter Gaal, San Diego, CA (US); Peter Pui Lok Ang, San Diego, CA (US); Alexei Yurievitch Gorokhov, San Diego, CA (US); Le Liu, Fremont, CA (US); Wooseok Nam, San Diego, CA (US); Heechoon Lee, San Diego, CA (US); Hari Sankar, San Diego, CA (US); Changhwan Park, San Diego, CA (US); Yuchul Kim, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/400,547

(22) Filed: Aug. 12, 2021

(65) Prior Publication Data
US 2022/0078710 A1 Mar. 10, 2022

Related U.S. Application Data

(60) Provisional application No. 63/074,942, filed on Sep. 4, 2020.

(51) Int. Cl.
*H04W 52/02* (2009.01)
*H04W 68/00* (2009.01)
(Continued)

(52) U.S. Cl.
CPC ....... *H04W 52/0229* (2013.01); *H04L 5/0051* (2013.01); *H04W 52/0212* (2013.01); *H04W 68/005* (2013.01); *H04W 72/23* (2023.01)

(58) Field of Classification Search
None
See application file for complete search history.

(56) References Cited

U.S. PATENT DOCUMENTS

2020/0112917 A1* 4/2020 Nam .................... H04W 72/23
2020/0137602 A1 4/2020 Zhang et al.
(Continued)

OTHER PUBLICATIONS

International Search Report and Written Opinion—PCT/US2021/071174—ISA/EPO—dated Nov. 23, 2021.
(Continued)

*Primary Examiner* — Yemane Mesfin
*Assistant Examiner* — Jeff Banthrongsack
(74) *Attorney, Agent, or Firm* — Qualcomm Incorporated; Dang M. Vo

(57) ABSTRACT

Aspects of the present disclosure relate to wireless communications, and more particularly, to reference signal (RS) designs that allow for tracking loop updates and paging of UEs using various RSs. One example method includes identifying reference signal (RS) monitoring occasions for a user equipment (UE) in an idle or inactive mode; and transmitting, to the UE, reference signals in the identified RS monitoring occasions, the RS monitoring occasions being associated with RS for tracking purposes and RS for an indication the UE is to wake up to process additional signaling.

26 Claims, 11 Drawing Sheets

(51) Int. Cl.
*H04L 5/00* (2006.01)
*H04W 72/23* (2023.01)

(56) References Cited

U.S. PATENT DOCUMENTS

2020/0221384 A1* 7/2020 Ang ................. H04W 52/0229
2021/0321330 A1* 10/2021 Ang ..................... H04L 5/0048

OTHER PUBLICATIONS

Qualcomm Incorporated: "Potential Techniques for UE PowerSaving", 3GPP Draft, 3GPP TSG-RAN WG1 #96, R1-1903016 Potential Techniques for UE PowerSaving, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051600713, 33 pages, Retrieved from the Internet: URL: http://www.3gpp.org/ftp/tsg%5Fran/WG1%5FRL1/TSGR1%5F96/Docs/R1%2D1903016%2Ezip [retrieved on Feb. 16, 2019] sections 2-4, paragraph[2. 2 .1]—paragraph [2. 2. 2] paragraph [2. 3.1.1]—paragraph [2. 3 .1.2] paragraph[3. 3 .1]—paragraph [3.3.3] paragraph [3. 4 .1]—paragraph [3. 4 .1]. sections 1-3, in particular sections 3.1, 3.2, 3.3, 3.4.1. 3.4.2.

* cited by examiner

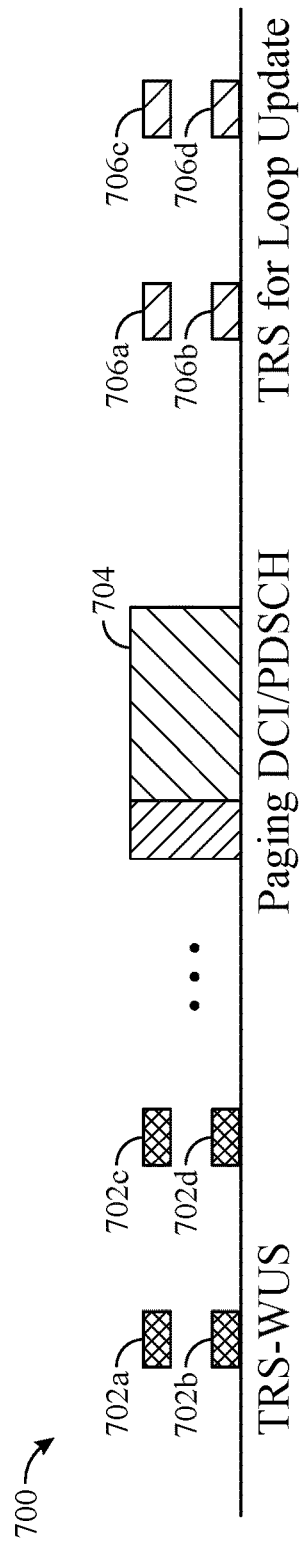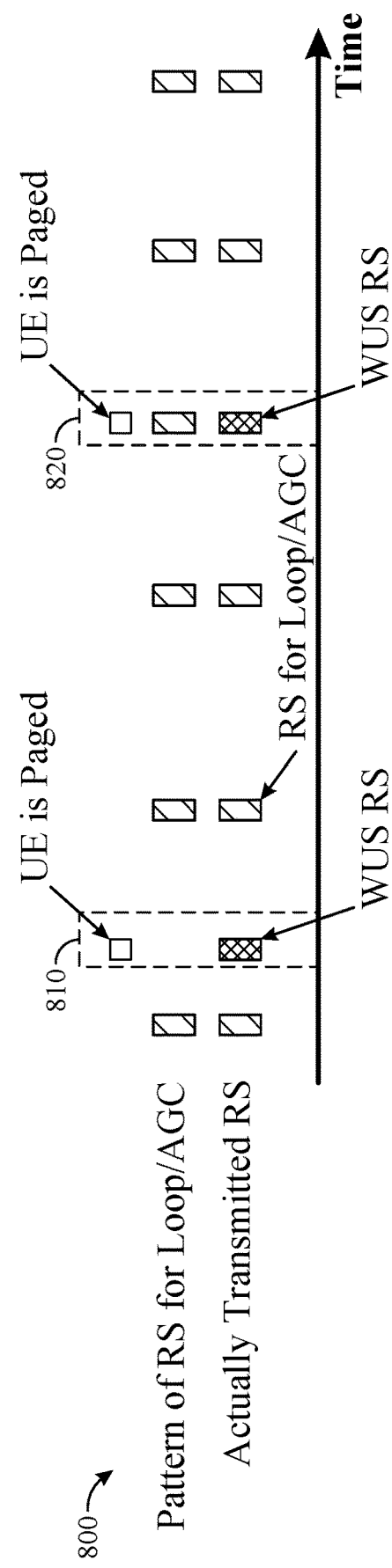

REFERENCE SIGNAL DESIGN FOR IDLE AND INACTIVE MODE USER EQUIPMENTS

CROSS-REFERENCE TO RELATED APPLICATIONS

This application claims benefit to U.S. Provisional Patent Application Ser. No. 63/074,942, entitled "Reference Signal Design for Idle and Inactive Mode User Equipments (UEs)," filed Sep. 4, 2020 and assigned to the assignee hereof, the contents of which are hereby incorporated by reference in its entirety.

TECHNICAL FIELD

Aspects of the present disclosure relate to wireless communications, and more particularly, to reference signal designs for idle and inactive mode user equipments (UEs).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes determining reference signal (RS) monitoring occasions; and monitoring, while the UE is in an idle or inactive mode, the RS monitoring occasions for RS for tracking purposes and for an indication the UE is to wake up to process additional signaling.

One innovative aspect of the subject matter described in this disclosure can be implemented in a method for wireless communication by a network entity. The method generally includes identifying reference signal (RS) monitoring occasions for a user equipment (UE) in an idle or inactive mode; and transmitting, to the UE, reference signals in the identified RS monitoring occasions, the RS monitoring occasions being associated with RS for tracking purposes and RS for an indication the UE is to wake up to process additional signaling.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 7 illustrates an example timeline for transmission of reference signals (RSs) for tracking purposes and for an indication the UE is to wake up to process additional signaling in which the RSs are transmitted in separate resources, in accordance with some aspects of the present disclosure.

FIG. 8 illustrates an example timeline for transmission of reference signals (RSs) for tracking purposes and for an indication the UE is to wake up to process additional signaling in which the RSs are transmitted in potentially overlapping resources, in accordance with some aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to reference signal designs for idle or inactive mode user equipments (UEs) that allow for UEs to update tracking parameters and to be paged while in an idle or inactive mode.

The following description provides examples of reference signal designs for idle or inactive mode UEs that allow for UEs to update tracking parameters and to be paged while in an idle or inactive mode, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
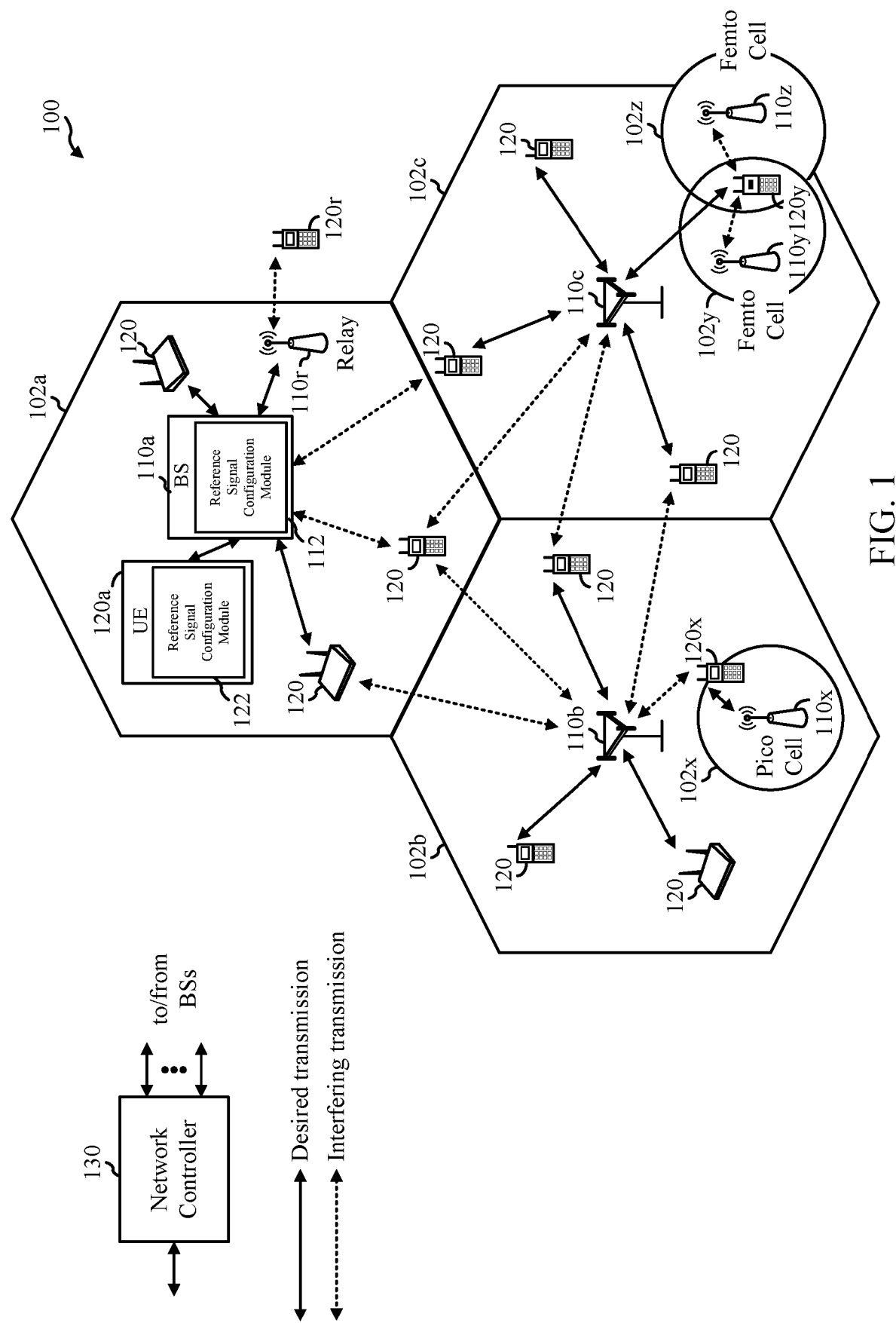
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a reference signal configuration module 122 that may be configured to perform (or cause UE 120a to perform) operations 500 of FIG. 5. Similarly, a BS 110a may include a reference signal configuration module 112 that may be configured to perform (or cause BS 110a to perform) operations 600 of FIG. 6.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
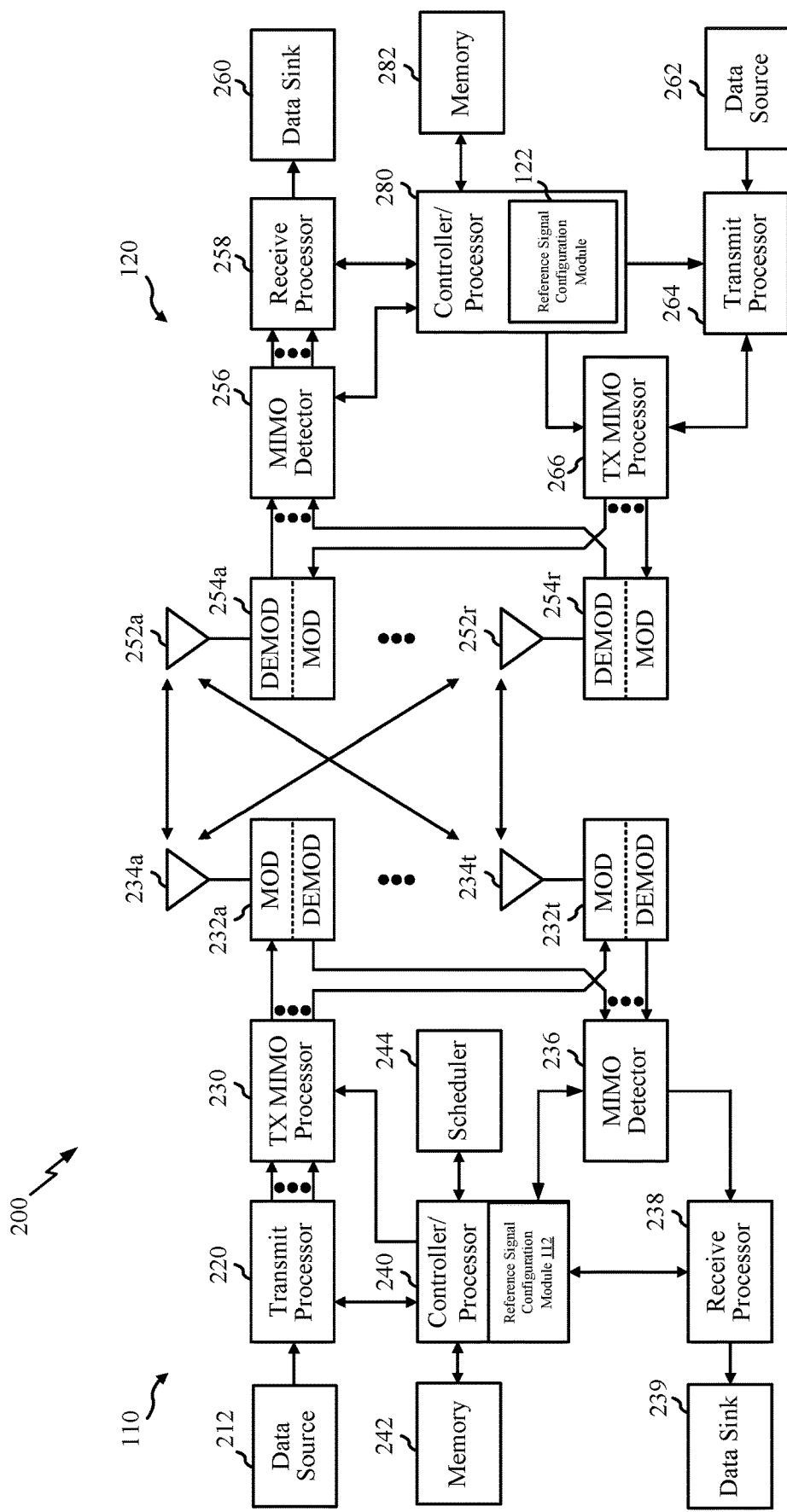
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a reference signal configuration module 122 that may be configured to perform (or cause UE 120 to perform) operations 500 of FIG. 5. Similarly, the BS 120a may include a reference signal configuration module 112 that may be configured to perform (or cause BS 110a to perform) operations 600 of FIG. 6.

Figure 3A:
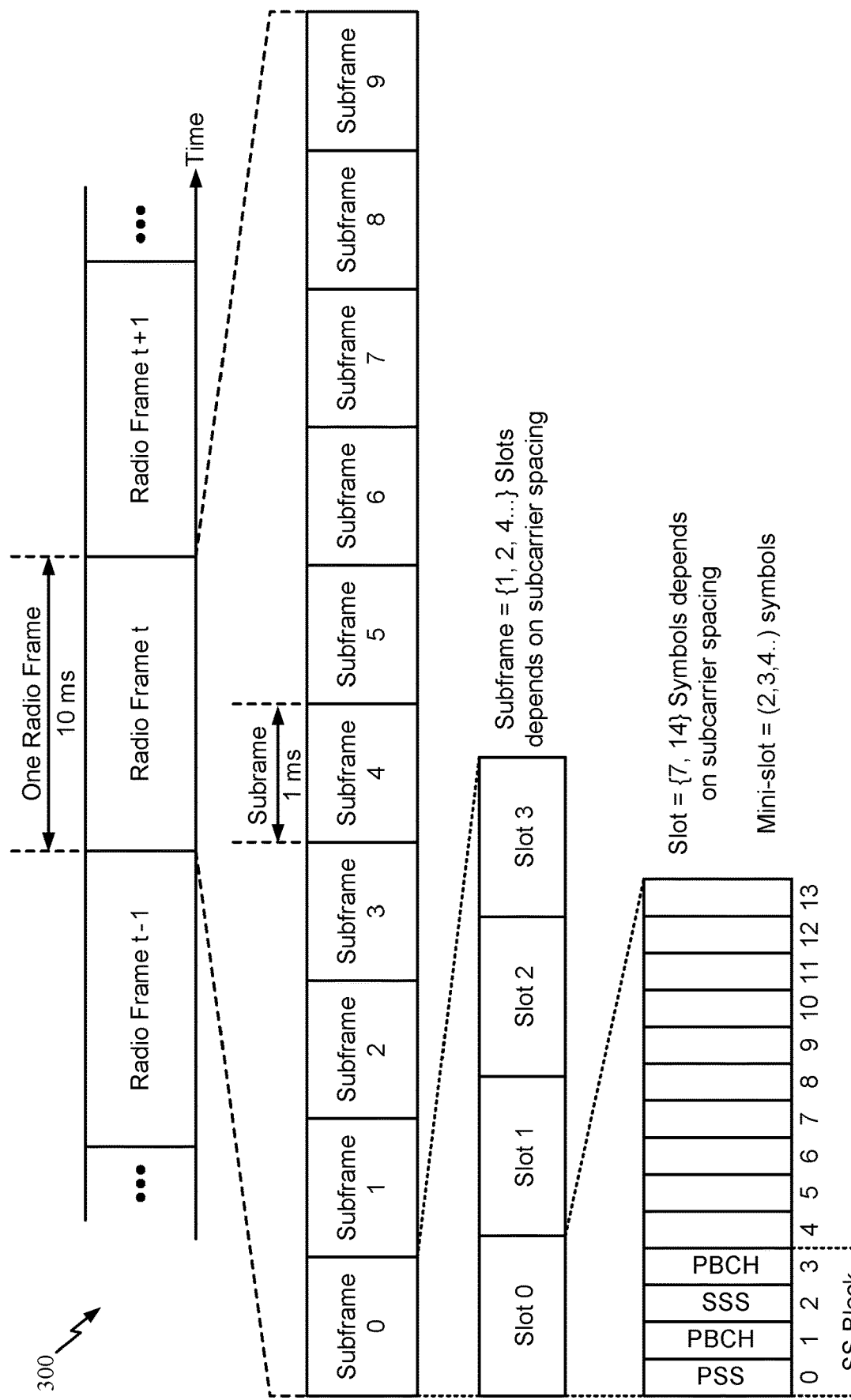
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
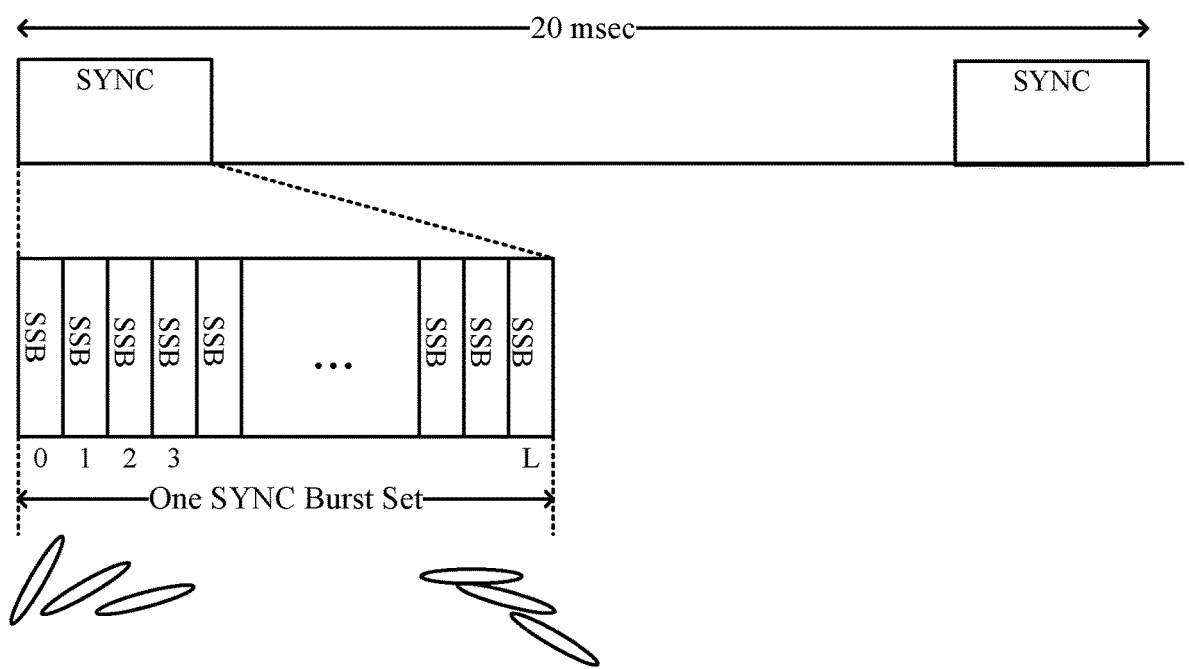
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

In NR, a wake up signal (WUS) is defined which is monitored by the UE outside the Active Time. The WUS may be detected with relatively simple receiver components, allowing the UE to stay in a reduced power state. The WUS indicates whether the UE should wake up (more fully) for PDCCH monitoring.

Example Reference Signal Designs for Updating Tracking and Paging Idle and Inactive Mode User Equipments (UEs)

Aspects of the present disclosure relate to wireless communications, and more particularly, to reference signal (RS) designs for idle or inactive mode UEs that allow for UEs to update tracking parameters and to be paged while in an idle or inactive mode. As will be described in greater detail below, RS monitoring occasions may be configured periodically and/or aperiodically such that idle or inactive mode UEs can perform tracking updates and/or receiving paging from a network entity.

Idle and inactive mode UEs generally use information carried in synchronization signal blocks (SSBs) for time-frequency tracking loop and automatic gain control updates. The SSB location may be fixed within a subframe and may have a fixed periodicity. However, because the location of an SSB is generally fixed and because SSBs may not be synchronized with paging occasions (POs) for the UE, the UE may perform additional wake up operations outside of its POs in order to receive and decode the SSBs. Thus, the UE may stay in a light sleep mode between SSBs and POs, which may use more power than would be used by the UE if the UE were in a deep sleep mode, since the UE may use a shorter sleep cycle duration while in the light sleep mode than the UE would use if the UE were in a deep sleep mode.

Flexible reference signals, such as tracking reference signals (TRSs) or other special types of CSI-RSs, may be used for tracking loop updates. By using these flexible RSs for tracking loop updates, a number of times the UE wakes up outside of POs may be reduced. Further, other reference signals may be used as a wakeup signal (WUS) or paging early indication (PEI) to indicate, to the UE, whether the UE will be paged in the next paging occasion (i.e., whether a paging message is awaiting the UE at the next paging occasion). A PEI may also be referred to as a paging indication signal (PIS). These other reference signals may allow for idle or inactive UEs to process paging messages similarly to how paging messages are processed when the UE is in a connected state, where a connected mode WUS indicates whether a connected mode UE enters the next discontinuous reception instance.

Figure 4:
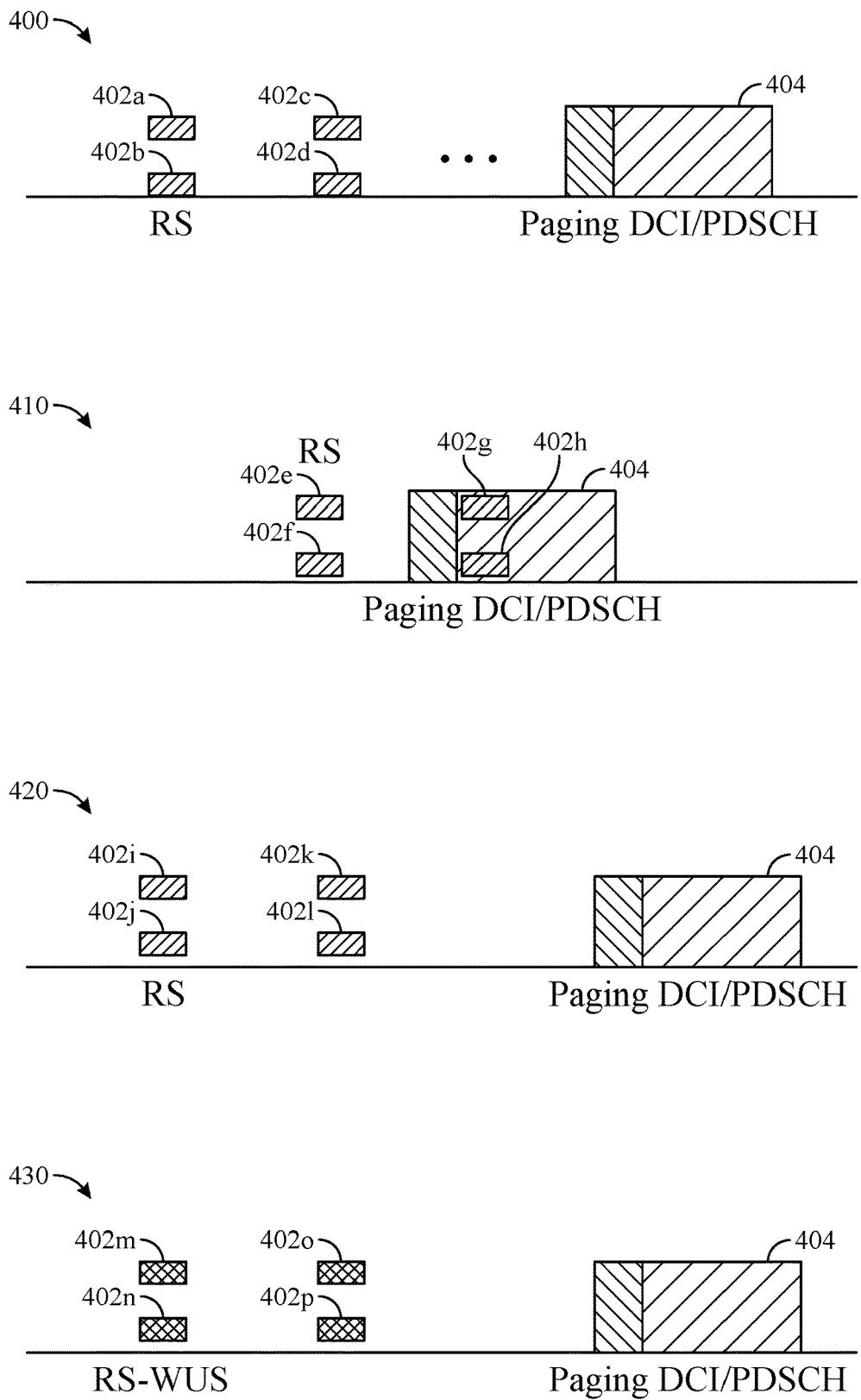
FIG. 4 illustrates examples of reference signal time-frequency resource usage for tracking purposes and for an indication the UE is to wake up to process additional signaling

FIG. 4 illustrates various reference time-frequency resource usage examples for transmitting reference signals used by a UE for tracking purposes and as an indication that the UE is to wake up to process example signaling.

Examples 400 and 410 illustrate examples in which a reference signal 402 is used for tracking loop and/or automatic gain control (AGC) updates. Closer alignment of the RS 402 with a paging occasion may allow the UE to wake up less often than in SSB-based tracking loop and/or automatic gain control updates and avoid spending time in a non-deep (e.g., light) sleep state.

As illustrated, example 400 depicts a scenario in which various RSs 402a-402d (e.g., tracking reference signals (TRSs), etc.) do not overlap with a physical downlink shared channel (PDSCH), or a channel which may carry paging messages for the UE. In such a case, a UE may periodically wake up to measure the RSs 402 for tracking loop and AGC updates and may receive signaling with an indication that the UE is to wake up to receive paging messages 404. As illustrated, the paging messages 404 may include a paging DCI or a paging PDSCH In example 410, RSs 402 may overlap with a paging message 404. In such a case, the RSs that overlap with the paging message 404 (e.g., RSs 402g and 402h) may be time division multiplexed or frequency division multiplexed with the paging message 404 (e.g., carried on the PDSCH). Offline processing of the PDSCH (e.g., based on buffered intermediate quadrature samples of the PDSCH) may be supported if an RS 402 follows a signal indicating that a paging message 404 is awaiting the UE.

Examples 420 and 430 illustrate examples in which an RS 402 is used as a WUS or PEI. In such a case, the RS 402 indicates, in advance of a paging occasion, whether the UE is to wake up to decode a paging message 404 (e.g., a downlink control information (DCI) message or other paging information carried on the PDSCH). WUS and PEI detection may be performed by a front end module without needing to decode the WUS or PEI. For example, the front end may detect received energy over a threshold amount at the time periods in which an RS 402 used as a WUS or a PEI is received. If no RS 402 used as a WUS or a PEI is received, the UE need not activate one or more baseband processors to process a received signal. Example 420 illustrates an example in which an RS is transmitted whether the UE is paged or not. Example 430 illustrates an example in which the RS is transmitted when the UE is paged.

When an additional RS is used for UE tracking loop and/or automatic gain control, periodic transmission of the additional RS may allow for the UE to update its tracking area and/or adjust gain parameters for subsequent communications with a network entity. However, when the additional RS also serves as a WUS or PEI, the additional RS may not be transmitted periodically, since each individual UE served by a base station may be rarely paged (e.g., once every few minutes). Because UEs may be infrequently paged, UEs may not be able to rely on RSs serving as a WUS or PEI for tracking loop and/or automatic gain control updates.

Figure 5:
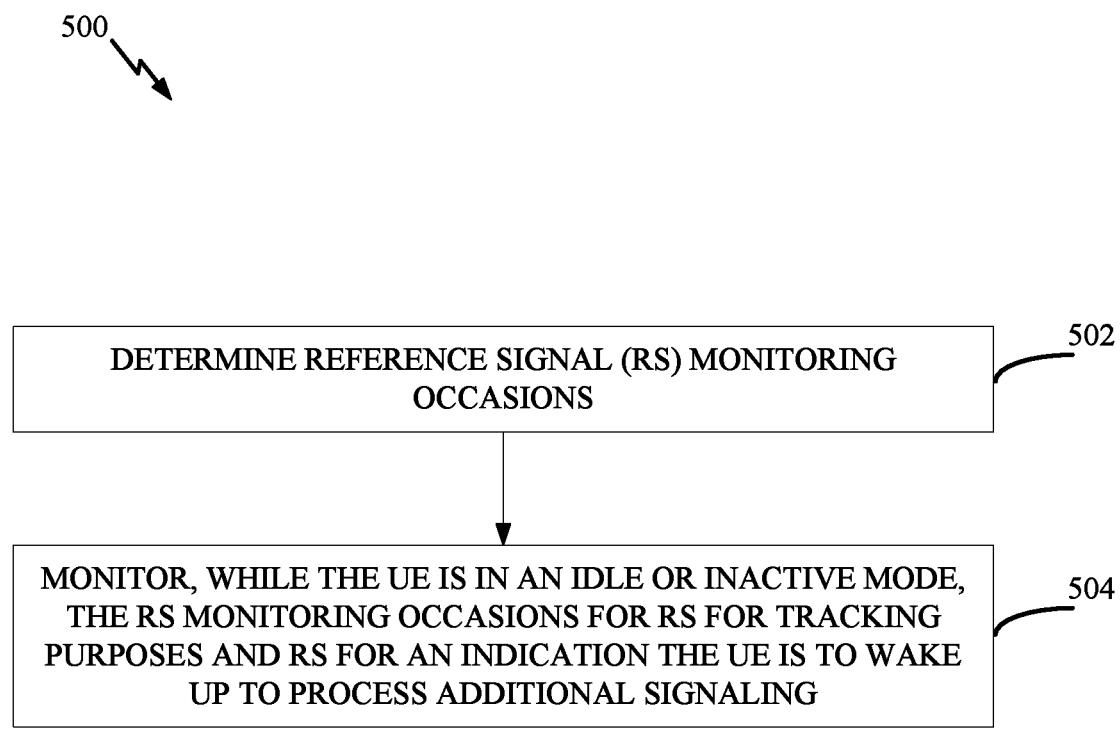
FIG. 5 illustrates example operations for wireless communication by a user equipment (UE), in accordance with some aspects of the present disclosure.

FIG. 5 illustrates example operations 500 that may be performed by a user equipment (UE) for tracking loop and/or automatic gain updates and for waking up to receive paging messages based on reference signals (RSs) received from a network entity, in accordance with certain aspects of the present disclosure.

As illustrated, operations 500 may begin at block 502, where the UE determines reference signal (RS) monitoring occasions. In some aspects, in determining RS monitoring occasions, the UE can receive information from a network entity identifying when the UE is to monitor for RSs. This information may include, information identifying a periodicity and/or frequency resources corresponding to RSs transmitted by the network entity, information identifying a type of RS for which the identified periodicity is applicable (e.g., whether the RS is used as a WUS or PEI), and the like. For example, the information received from the network entity may indicate a first indication of time and/or frequency resources for RSs used for tracking loop and automatic gain control updating, and a second indication of time and/or frequency resources for RSs used as a WUS or PEI.

At block 504, the UE monitors, while the UE is in an idle or inactive mode, the RS monitoring occasions for for RSs tracking purposes and RSs for an indication the UE is to wake up to process additional signaling. Generally, the UE can monitor the time and/or frequency resources identified in signaling received from the network entity for RSs used as a WUS or PEI to determine when the UE is to wake up to process paging messages from the network entity. As discussed, because RSs used as a WUS or PEI may be transmitted when a paging message is pending for the UE, but may not be transmitted when no paging messages are pending for the UE, the UE may monitor for these RSs by determining that a received energy on time/frequency resources on which these RSs are scheduled to be transmitted exceeds a threshold value indicative of transmission of a signal (e.g., a received power exceeding a defined noise floor). If the UE determines that an RS used as a WUS or PEI has been transmitted, the UE can wake up at a next paging occasion to process paging messages from the network entity; otherwise, the UE can remain in a low power mode at the next paging occasion, as no paging messages may be pending for the UE if an RS used as a WUS or PEI has not been received.

Figure 6:
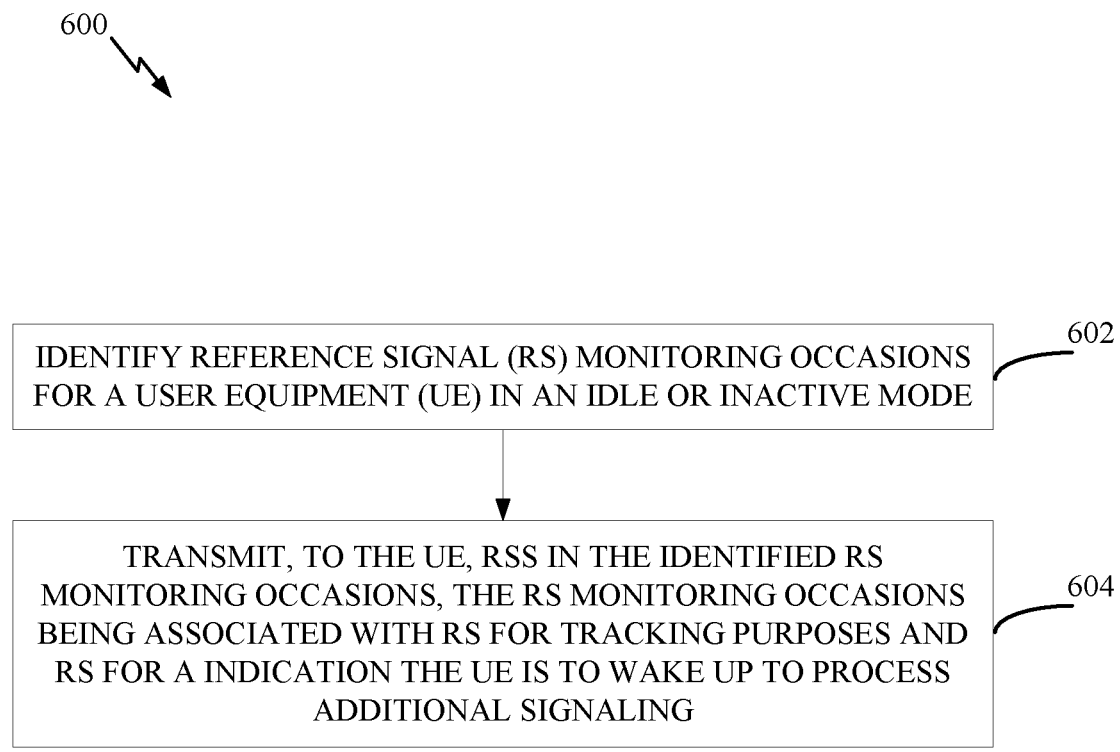
FIG. 6 illustrates example operations for wireless communication by a network entity, in accordance with some aspects of the present disclosure.

FIG. 6 illustrates example operations 600 that may be performed by a network entity (e.g., a base station, gNodeB, etc.) for transmitting RSs to a UE for use in tracking loop and/or automatic gain updates and for configuring the UE to wake up to receive paging messages based on reference signals received from a network entity, in accordance with certain aspects of the present disclosure.

As illustrated, operations 600 may begin at block 602, where the network entity identifies reference signal (RS) monitoring occasions for a user equipment (UE) in an idle or inactive mode. The RS monitoring occasions may be identified, for example, as a first set of RS monitoring occasions associated with RSs used for tracking purposes and a second set of RS monitoring occasions associated with RSs used as a WUS or PEI. The identified monitoring occasions may identify, for example, time/frequency resources on which RSs are to be transmitted. For RSs used as a WUS or PEI, transmission of an RS at an identified monitoring occasion may indicate that paging messages are pending for the UE, while skipping transmission of an RS at an identified monitoring occasion may indicate that no paging messages are pending for the UE.

At block 604, the network entity transmits, to the UE, RSs in the identified RS monitoring occasions. The RS monitoring occasions may be associated with RSs for tracking purposes and RSs for an indication the UE is to wake up to process additional signaling. As discussed, the network entity can transmit RSs for tracking purposes according to a first configuration (e.g., periodically, on defined time/frequency resources) and can transmit RSs used as a WUS or PEI when paging messages are pending for the UE.

FIG. 7 illustrates an example 700 of RS monitoring occasions in which separate RSs are used for tracking purposes (e.g., tracking loop and/or automatic gain control updates) and for an indication that the UE is to wake up to process additional signaling (e.g., as a WUS or PEI). In example 700, the network entity may provide RSs 702 used as an indication that the UE is to wake up to process additional signaling and RSs 706 used for tracking purposes in different time resources (e.g., different symbols) and/or different frequency resources (e.g., different sets of resource elements). In some aspects, when the RSs for tracking purposes 706 and the RSs for an indication that the UE is to wake up to process additional signaling 702 occupy different time resources, the RSs may use different or the same sequences. Different sequences may be used for the RSs for tracking purposes 706 and the RSs for an indication that the UE is to wake up to process additional signaling 702 if the RSs occupy different frequency resources in a same symbol, which may avoid false detection of tracking RSs or WUS/PEI signals caused from energy leakage to unused subcarriers.

In some aspects, the RSs for tracking purposes 706 may be transmitted by the network entity sparsely. The RSs for tracking purposes 706 may be transmitted once every N paging cycles. Meanwhile, the RSs for an indication that the UE is to wake up to process additional signaling 702 may be transmitted by the network entity to the UE when the UE is paged. In some aspects, an RS 702 for an indication that the UE is to wake up to process additional signaling may also be used for a tracking loop update and/or automatic gain control update. When the UE detects an RS for an indication that the UE is to wake up to process additional signaling 702, the UE may process a next paging occasion by decoding the paging physical downlink control channel (PDCCH) 704 and a paging message. The decoding may be performed, for example, based a cyclic redundancy check scrambled by a paging radio network temporary identifier (P-RNTI).

The RSs for tracking purposes 706 and the RSs for an indication that the UE is to wake up to process additional signaling 702 may be configured on a per-UE-group basis. The RSs for tracking purposes 706 and the RSs for an indication that the UE is to wake up to process additional signaling 702 may be associated with the same group or different groups of UEs sharing a same paging occasion.

FIG. 8 illustrates an example 800 of RS monitoring occasions in which RSs for tracking purposes and the RSs for an indication that the UE is to wake up to process additional signaling may be transmitted on potentially overlapping resources. In this example, different sequences may be used for RSs for tracking purposes and the RSs for an indication that the UE is to wake up to process additional signaling, as a UE may blindly decode these reference signals. As illustrated, the aperiodically transmitted RSs for indicating that the UE is to wake up to process additional signaling (e.g., a WUS or PEI) may be transmitted separately from RSs for tracking purposes, as illustrated at time 810, or may overlap a periodically transmitted RS for tracking purposes (e.g., may share the same set of resource elements and symbols), as illustrated at time 820. If a RS for an indication that the UE is to wake up collides with an RS for tracking purposes, the network entity may transmit RS for indicating that the UE is to wake up and need not transmit the RS for tracking purposes, as RSs for indicating that the UE is to wake up can also be used for tracking loop updates and/or automatic gain control updates.

As discussed above, the RSs for tracking purposes may be transmitted in a sparse manner with a long periodicity of N paging cycles. Meanwhile, the RSs for indicating that the UE is to wake up to process additional signaling may be transmitted aperiodically, such as whenever the UE is paged. When a UE detects one of these RSs for indicating that the UE is to wake up to process additional signaling, the UE may process the next paging occasion by decoding both the paging PDCCH and the paging message on the PDSCH.

Further, as discussed above, the two RSs can be associated with a same group or different groups of UEs sharing a same paging occasion.

Figure 9:
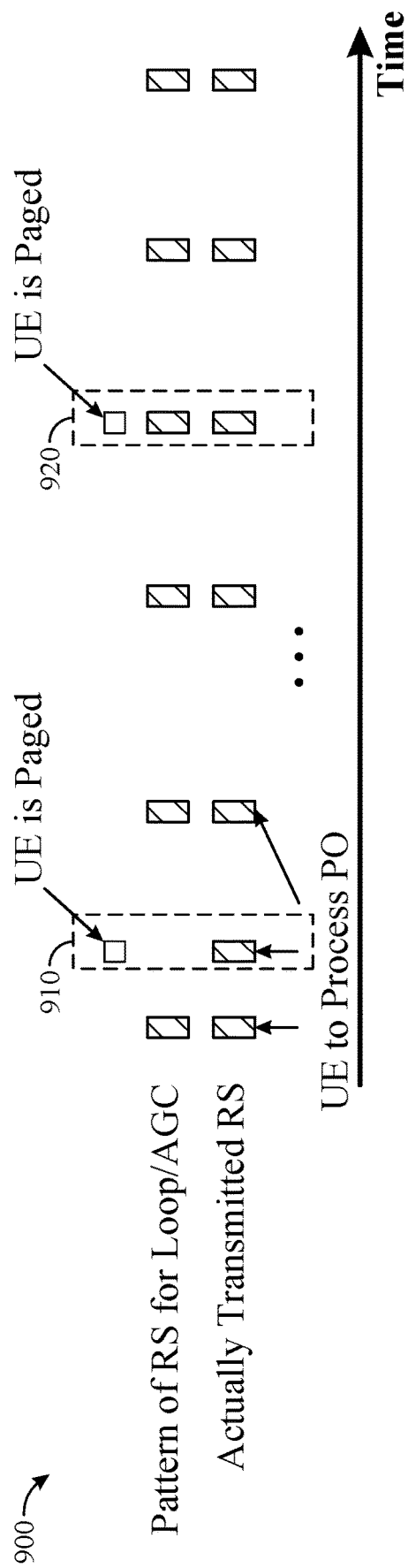
FIG. 9 illustrates an example timeline for transmission of reference signals (RSs) for tracking purposes and for an indication the UE is to wake up to process additional signaling in which the RSs are identical, in accordance with some aspects of the present disclosure.

FIG. 9 illustrates an example 900 of RS monitoring occasions in which RSs for tracking purposes and the RSs for an indication that the UE is to wake up to process additional signaling are the same resource signal. The same sequence may be used for the RSs for tracking purposes and the RSs for an indication that the UE is to wake up to process additional signaling. Further, the resources may be transmitted on a same time/frequency resource. As discussed above, the RSs may be transmitted sparsely with a long periodicity (e.g., of N paging cycles) for tracking purposes (e.g., tracking updates and/or automatic gain control updates). Additional RSs may be transmitted by the network entity whenever the UE is paged. These additional RSs may be transmitted between different occasions in which the network entity transmits the RSs for tracking purposes, as illustrated at time 910. Further, as discussed above, an RS may simultaneously be used for tracking purposes and to indicate that the UE is to wake up to process additional signaling, as illustrated at time 920.

In some aspects, the periodically transmitted RSs for tracking purposes and the additional RSs for indicating that the UE is to wake up to process additional signaling may use the same set of resource elements in a RS transmission occasion in which an RS is transmitted for tracking purposes and the UE is paged on a downlink channel. Because the UE may not be able to distinguish whether an RS is transmitted because the RS is paged around an occasion of the periodically transmitted RS, the UE may assume that it is paged when receiving the periodically transmitted RS for tracking purposes.

In some aspects, information about the RSs for tracking purposes and the RSs for indicating that the UE is to wake up to process additional signaling may be provided to UEs in an idle or inactive state using various techniques. In one example, UEs may be pre-configured with this information through information carried in a system information block (SIB) or in preconfigured, a priori defined information. In another example, UEs may be configured with this information through unused bits in a DCI message (e.g., unused bits in a DCI format 1_0 message, such as a paging DCI message). The unused bits may include reserved bits, a short message field if the DCI message does not include a short message, or unused bits in one or more fields of a short message if the DCI message includes a short message.

In some aspects, as discussed above, different sequences may be used to encode (and correspondingly decode) the RSs for tracking purposes and the RSs for indicating that the UE is to wake up to process additional signaling. The network entity may configure the UE with sequence generation information used for the different sequences for encoding these RSs. For example, information in respect of a set of candidate tracking reference signals (TRSs) or CSI-RSs may be included in a SIB or may be defined a priori. In some aspects, the network entity may signal, to a UE, one or a subset of TRSs or CSI-RSs in reserved bits of a DCI message and/or in a short message field of the DCI message, if no short message field is configured.

Figure 10:
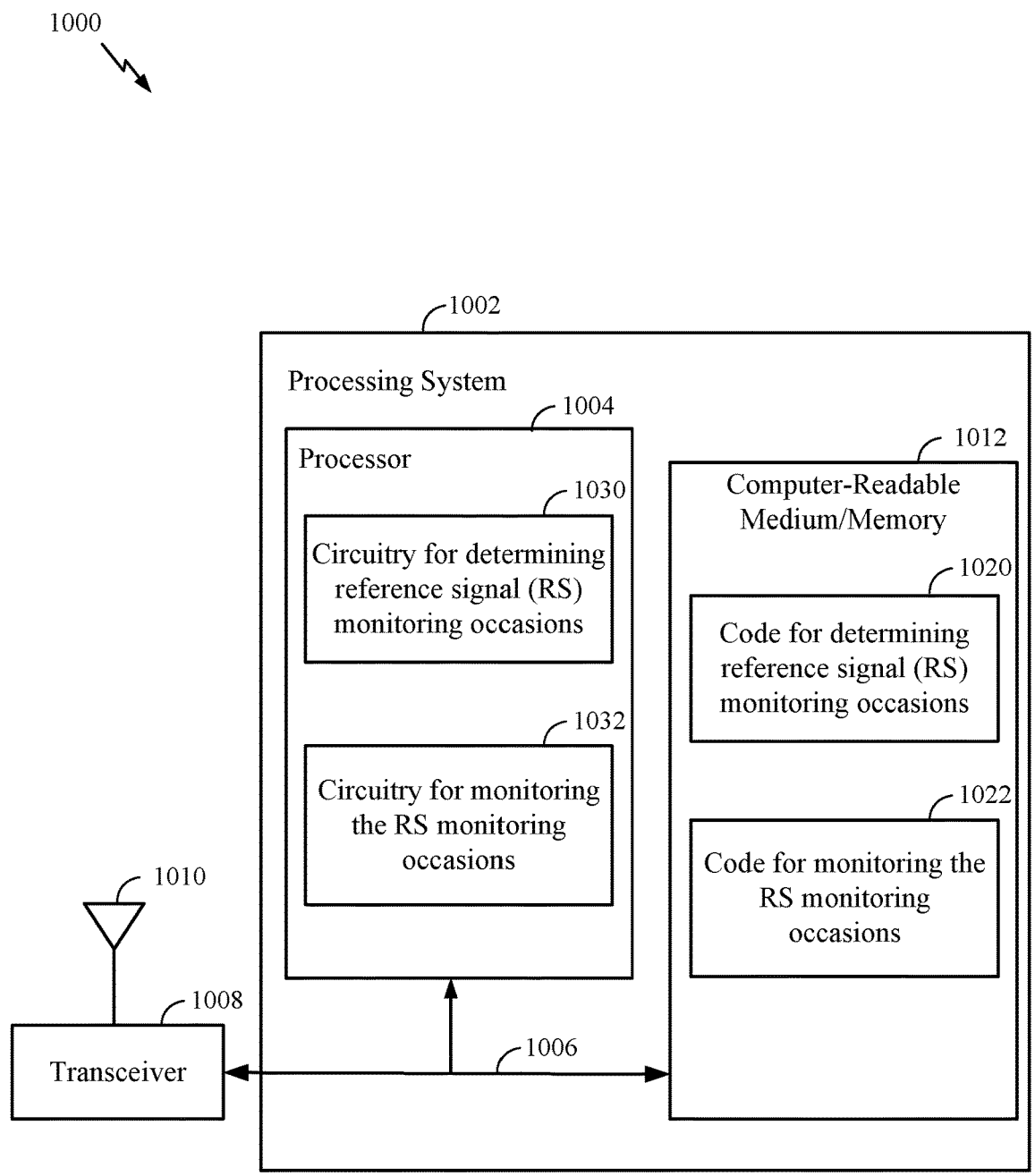
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 5. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 5, or other operations for tracking loop and/or automatic gain updates and for waking up to receive paging messages based on reference signals (RSs) received from a network entity. In certain aspects, computer-readable medium/memory 1012 stores code 1020 for determining reference signal (RS) monitoring occasions; and code 1022 for monitoring the RS monitoring occasions. In certain aspects, the processor 1004 has circuitry configured to implement the code stored in the computer-readable medium/memory 1012. The processor 1004 includes circuitry 1030 for determining reference signal (RS) monitoring occasions; and circuitry 1032 for monitoring the RS monitoring occasions.

Figure 11:
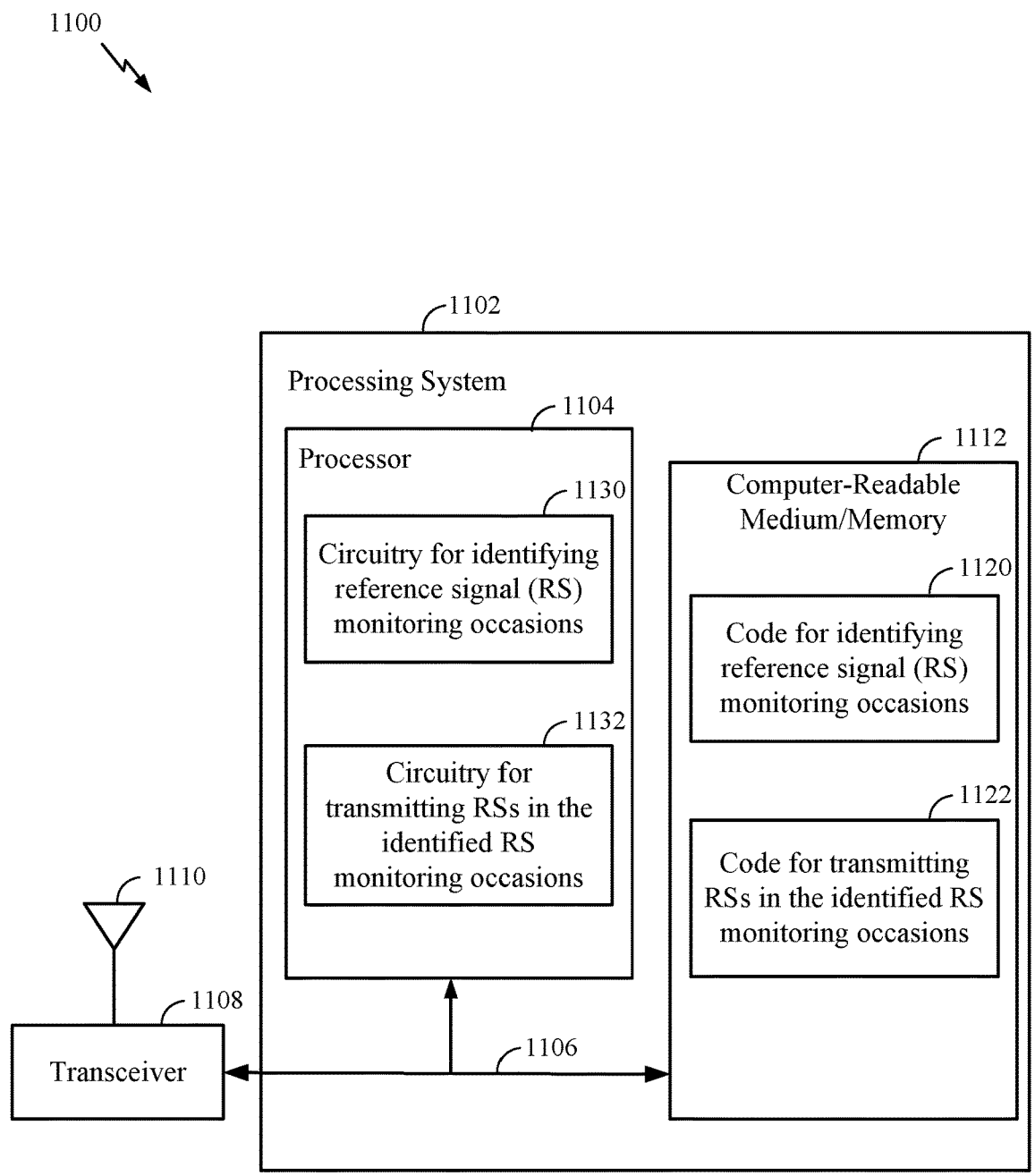
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 6. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6, or other operations for transmitting RSs to a UE for use in tracking loop and/or automatic gain updates and for configuring the UE to wake up to receive paging messages based on reference signals received from a network entity. In certain aspects, computer-readable medium/memory 1112 stores code 1120 for identifying reference signal (RS) monitoring occasions; and code 1122 for transmitting RSs in the identified RS monitoring occasions. In certain aspects, the processor 1104 has circuitry configured to implement the code stored in the computer-readable medium/memory 1112. The processor 1104 includes circuitry 1130 for identifying reference signal (RS) monitoring occasions; and circuitry 1132 for transmitting RSs in the identified RS monitoring occasions.

Example Clauses

Clause 1: A method for wireless communications by a user equipment (UE), comprising: determining reference signal (RS) monitoring occasions; and monitoring, while the UE is in an idle or inactive mode, the RS monitoring occasions for RS for tracking purposes and for an indication the UE is to wake up to process additional signaling.

Clause 2: The method of Clause 1, wherein the RS for tracking purposes comprises an RS used by the UE for one or more of a time tracking loop update, frequency tracking loop update, or an automatic gain control (AGC) update.

Clause 3: The method of any one of Clauses 1 or 2, wherein the RS for tracking purposes and the RS for an indication the UE is to wake up comprise different orthogonal frequency division multiplexed (OFDM) symbols.

Clause 4: The method of Clause 3, wherein the RS for tracking purposes and the RS for an indication the UE is to wake up are demodulated using a same sequence.

Clause 5: The method of Clause 3, wherein the RS for tracking purposes and the RS for an indication the UE is to wake up are demodulated using different sequences.

Clause 6: The method of any one of Clauses 1 through 5, wherein the RS for tracking purposes and the RS for an indication the UE is to wake up comprise different resource elements in a resource block on a same set of orthogonal frequency division multiplexed (OFDM) symbols.

Clause 7: The method of Clause 6, wherein the RS for tracking purposes and the RS for an indication the UE is to wake up are demodulated using different sequences.

Clause 8: The method of any one of Clauses 1 through 7, wherein the RS monitoring occasions for RS for tracking purposes occurs at a different periodicity than RS monitoring occasions for RS for an indication the UE is to wake up.

Clause 9: The method of Clause 8, wherein the RS for an indication the UE is to wake up is received when the UE is paged.

Clause 10: The method of any one of Clauses 1 through 9, wherein detecting an RS for an indication the UE is to wake up triggers decoding of one or more of a paging physical downlink control channel (PDCCH) or a paging message in a subsequent paging occasion.

Clause 11: The method of any one of Clauses 1 through 10, wherein the RS for tracking purposes and the RS for an indication the UE is to wake up are associated with a same group of UEs sharing a same paging occasion.

Clause 12: The method of any one of Clauses 1 through 10, wherein the RS for tracking purposes and the RS for an indication the UE is to wake up are associated with different groups of UEs sharing a same paging occasion.

Clause 13: The method of any one of Clauses 1 through 12, wherein the RS for tracking purposes and the RS for an indication the UE is to wake up are received on overlapping time and frequency domain resources.

Clause 14: The method of Clause 13, wherein the RS for tracking purposes and the RS for an indication the UE is to wake up are demodulated using different sequences.

Clause 15: The method of any one of Clauses 13 or 14, wherein the RS for an indication the UE is to wake up serves as the RS for tracking purposes when a collision exists between resources for the RS for tracking purposes and resources for the RS for an indication the UE is to wake up.

Clause 16: The method of any one of Clauses 1 through 15, wherein the RS for tracking purposes and the RS for an indication the UE is to wake up comprise RSs decoded using a same sequence and transmitted to the UE in a same set of resource elements in a resource block and a same set of orthogonal frequency division multiplexed (OFDM) symbols in a slot.

Clause 17: The method of Clause 16, wherein the RS for tracking purposes is transmitted periodically, and RSs for an indication the UE is to wake up is transmitted between different RSs for tracking purposes.

Clause 18: The method of any one of Clauses 16 or 17, further comprising: attempting to process paging messages when the RS for tracking purposes is received.

Clause 19: The method of any one of Clauses 1 through 18, further comprising: receiving information about the RS for tracking purposes and the RS for an indication the UE is to wake up in one or more of a system information block (SIB) or unused bits in a downlink control information (DCI) message format.

Clause 20: The method of Clause 19, wherein the information includes sequence generation information for sequences used to decode the RS for tracking purposes and the RS for an indication the UE is to wake up.

Clause 21: The method of any one of Clauses 19 or 20, wherein the information includes one or more of a set of candidate tracking reference signals (TRSs) or channel state information (CSI) reference signals (RSs) (CSI-RSs).

Clause 22: The method of Clause 21, wherein the one or more of the set of candidate TRSs or CSI-RSs is signaled in one or more of reserved bits in a DCI message or a short message field in the DCI message.

Clause 23: A method for wireless communications by a network entity, comprising: identifying reference signal (RS) monitoring occasions for a user equipment (UE) in an idle or inactive mode; and transmitting, to the UE while the UE is in an idle or inactive mode, RSs in the identified RS monitoring occasions, wherein the RS monitoring occasions are associated with RS for tracking purposes and RS for an indication the UE is to wake up to process additional signaling.

Clause 24: The method of Clause 23, wherein the RS for tracking purposes and the RS for an indication the UE is to wake up comprise one of: different orthogonal frequency division multiplexed (OFDM) symbols, or different resource elements in a resource block on a same set of orthogonal frequency division multiplexed (OFDM) symbols.

Clause 25: The method of any one of Clauses 23 or 24, wherein the RS monitoring occasions for RS for tracking purposes occurs at a different periodicity than RS monitoring occasions for RS for an indication the UE is to wake up.

Clause 26: The method of any one of Clauses 23 through 25, wherein transmitting an RS for an indication the UE is to wake up triggers, at the UE, decoding of a paging physical downlink control channel (PDCCH) and a paging message in a subsequent paging occasion.

Clause 27: The method of any one of Clauses 23 through 26, wherein the RS for tracking purposes and the RS for an indication the UE is to wake up are transmitted on overlapping time and frequency domain resources.

Clause 28: The method of any one of Clauses 23 through 27, further comprising: transmitting, to the UE, information about the RS for tracking purposes and the RS for an indication the UE is to wake up in one or more of a system information block (SIB) or unused bits in a downlink control information (DCI) message format.

Clause 29: An apparatus, comprising: a memory having instructions stored thereon, and a processor configured to execute the instructions to cause the apparatus to perform the operations of any one of Clauses 1 through 28.

Clause 30: An apparatus, comprising: means for performing the operations of any one of Clauses 1 through 28.

Clause 31: A computer-readable medium having instructions stored thereon which, when executed by a processor, causes the processor to perform the operations of any one of Clauses 1 through 28.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   determining reference signal (RS) monitoring occasions;
   monitoring, while the UE is in an idle or inactive mode, the RS monitoring occasions for RS for tracking purposes and RS for an indication the UE is to wake up to process additional signaling, and
   demodulating the RS for tracking purposes and the RS for an indication the UE is to wake up, wherein the demodulation comprises using a same sequence.

2. The method of claim 1, wherein the RS for tracking purposes comprises an RS used by the UE for one or more of a time tracking loop update, frequency tracking loop update, or an automatic gain control (AGC) update.

3. The method of claim 1, wherein the RS for tracking purposes and the RS for an indication the UE is to wake up comprise different orthogonal frequency division multiplexed (OFDM) symbols.

4. The method of claim 1, wherein the RS for tracking purposes and the RS for an indication the UE is to wake up comprise different resource elements in a resource block on a same set of orthogonal frequency division multiplexed (OFDM) symbols.

5. The method of claim 1, wherein the RS monitoring occasions for RS for tracking purposes occurs at a different periodicity than RS monitoring occasions for RS for an indication the UE is to wake up.

6. The method of claim 5, wherein the RS for an indication the UE is to wake up is received when the UE is paged.

7. The method of claim 1, wherein detecting an RS for an indication the UE is to wake up triggers decoding of one or more of a paging physical downlink control channel (PDCCH) or a paging message in a subsequent paging occasion.

8. The method of claim 1, wherein the RS for tracking purposes and the RS for an indication the UE is to wake up are associated with a same group of UEs sharing a same paging occasion.

9. The method of claim 1, wherein the RS for tracking purposes and the RS for an indication the UE is to wake up are associated with different groups of UEs sharing a same paging occasion.

10. The method of claim 1, wherein the RS for tracking purposes and the RS for an indication the UE is to wake up are received on overlapping time and frequency domain resources.

11. The method of claim 10, wherein the RS for an indication the UE is to wake up serves as the RS for tracking purposes when a collision exists between resources for the RS for tracking purposes and resources for the RS for an indication the UE is to wake up.

12. The method of claim 1, wherein the RS for tracking purposes and the RS for an indication the UE is to wake up comprise RSs transmitted to the UE in a same set of resource elements in a resource block and a same set of orthogonal frequency division multiplexed (OFDM) symbols in a slot.

13. The method of claim 12, wherein the RS for tracking purposes is transmitted periodically, and RSs for an indication the UE is to wake up is transmitted between different RSs for tracking purposes.

14. The method of claim 12, further comprising: attempting to process paging messages when the RS for tracking purposes is received.

15. The method of claim 1, further comprising:
receiving information about the RS for tracking purposes and the RS for an indication the UE is to wake up in one or more of a system information block (SIB) or unused bits in a downlink control information (DCI) message format.

16. The method of claim 15, wherein the information includes sequence generation information for sequences used to demodulate the RS for tracking purposes and the RS for an indication the UE is to wake up.

17. The method of claim 15, wherein the information includes one or more of a set of candidate tracking reference signals (TRSs) or channel state information (CSI) reference signals (RSs) (CSI-RSs).

18. The method of claim 17, wherein the one or more of the set of candidate TRSs or CSI-RSs is signaled in one or more of reserved bits in a DCI message or a short message field in the DCI message.

19. A method for wireless communications by a network entity, comprising:
identifying reference signal (RS) monitoring occasions for a user equipment (UE) in an idle or inactive mode; and
transmitting, to the UE while the UE is in an idle or inactive mode, RSs in the identified RS monitoring occasions, wherein the RS monitoring occasions are associated with RS for tracking purposes and RS for an indication the UE is to wake up to process additional signaling, wherein the RS for tracking purposes and the RS for an indication the UE is to wake up are modulated using a same sequence.

20. The method of claim 19, wherein the RS for tracking purposes and the RS for an indication the UE is to wake up comprise one of:
different orthogonal frequency division multiplexed (OFDM) symbols, or
different resource elements in a resource block on a same set of orthogonal frequency division multiplexed (OFDM) symbols.

21. The method of claim 19, wherein the RS monitoring occasions for RS for tracking purposes occurs at a different periodicity than RS monitoring occasions for RS for an indication the UE is to wake up.

22. The method of claim 19, wherein transmitting an RS for an indication the UE is to wake up triggers, at the UE, decoding of a paging physical downlink control channel (PDCCH) and a paging message in a subsequent paging occasion.

23. The method of claim 19, wherein the RS for tracking purposes and the RS for an indication the UE is to wake up are transmitted on overlapping time and frequency domain resources.

24. The method of claim 19, further comprising:
transmitting, to the UE, information about the RS for tracking purposes and the RS for an indication the UE is to wake up in one or more of a system information block (SIB) or unused bits in a downlink control information (DCI) message format.

25. A user equipment (UE), comprising:
a transceiver;
a memory comprising instructions; and
a processor configured to execute the instructions and cause the UE to:
determine reference signal (RS) monitoring occasions,
monitor, while the UE is in an idle or inactive mode, the RS monitoring occasions for RS for tracking purposes and RS for an indication the UE is to wake up to process additional signaling, and
demodulate, via the transceiver, the RS for tracking purposes and the RS for an indication the UE is to wake up, wherein the demodulation comprises using a same sequence.

26. A network entity, comprising:
a transmitter;
a memory comprising instructions; and
a processor configured to execute the instructions and cause the network entity to:
identify reference signal (RS) monitoring occasions for a user equipment (UE) in an idle or inactive mode, and
transmit, via the transmitter to the UE while the UE is in an idle or inactive mode, RSs in the identified RS monitoring occasions, wherein the RS monitoring occasions are associated with RS for tracking purposes and RS for an indication the UE is to wake up to process additional signaling, wherein the RS for tracking purposes and the RS for an indication the UE is to wake up are modulated using a same sequence.

* * * * *